UNITED STATES PATENT OFFICE.

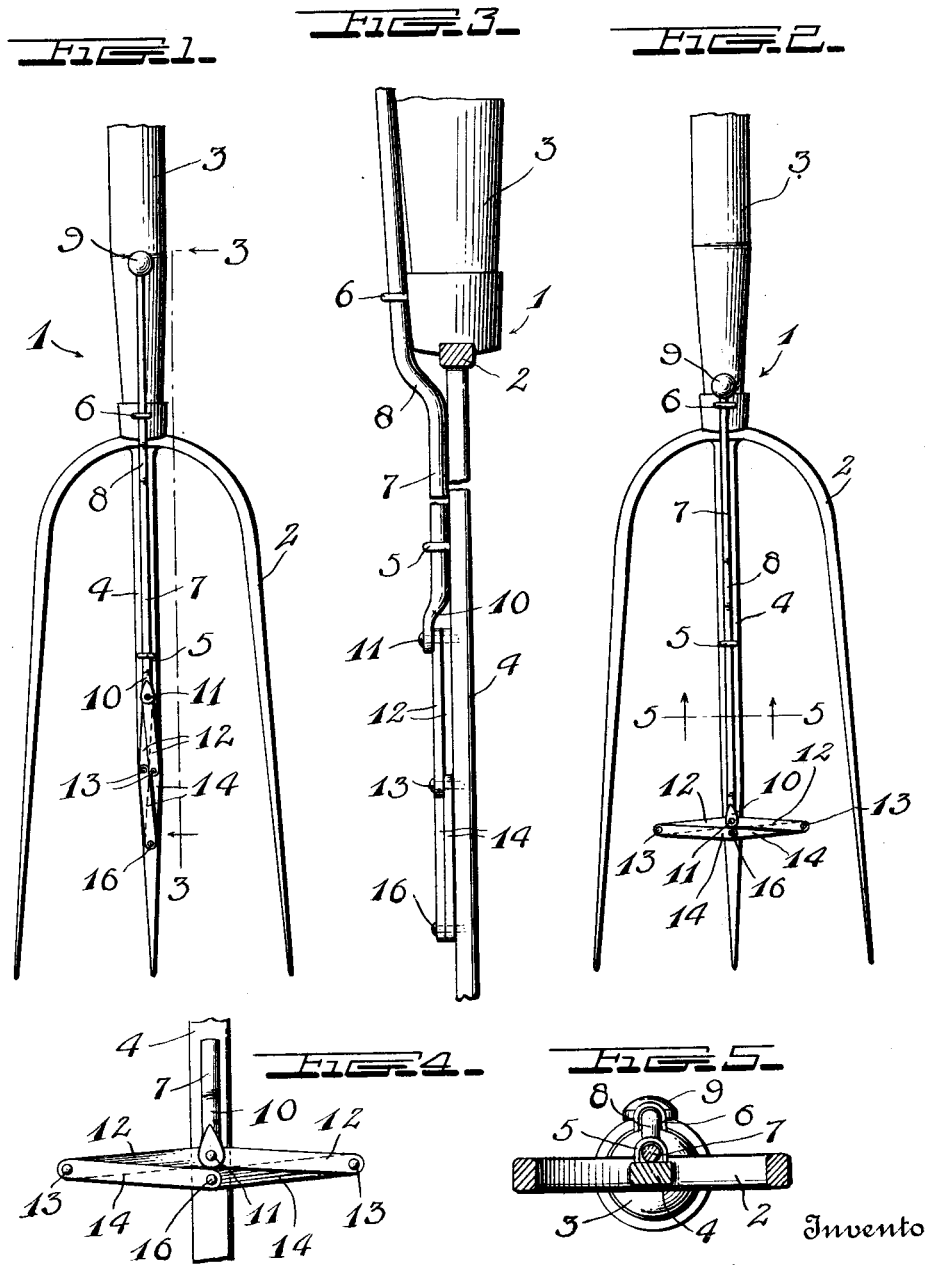

JOHN K. BLACKSTONE, OF CROWN POINT, INDIANA.

HAY-FORK.

1,169,917.  Specification of Letters Patent.  Patented Feb. 1, 1916.

Application filed August 16, 1915. Serial No. 45,792.

*To all whom it may concern:*

Be it known that I, JOHN K. BLACKSTONE, a citizen of the United States, residing at Crown Point, in the county of Lake and State of Indiana, have invented certain new and useful Improvements in Hay-Forks; and I do declare the following to be a full, clear, and exact description of the invention, such as will enable others skilled in the art to which it appertains to make and use the same.

My invention relates to improvements in hay forks, particularly those of the hand type and has for its object to provide novel means for retaining a quantity of hay upon the fork while being lifted or transported.

A further object is to provide means which may be readily applied to the ordinary hand pitch fork.

A still further object is to provide a simply constructed device which may be very cheaply manufactured but one which will be very efficient in operation.

With the above and minor objects in view, my invention resides in certain novel features of construction, combination and arrangement of parts which will hereinafter be more particularly described and claimed.

In the accompanying drawing: Figure 1 represents a side elevation of my improved hay fork showing the hay retaining means in inoperative position; Fig. 2 is a similar view illustrating said means in operative position; Fig. 3 is an enlarged vertical section taken on the line 3—3 of Fig. 1; Fig. 4 is an enlarged detail view of the toggles; Fig. 5 is an enlarged detail sectional view taken on the line 5—5 of Fig. 2.

In the drawing wherein similar reference characters designate corresponding parts throughout the several views, 1 indicates broadly a hay fork having a head 2 at one end preferably formed with three tines, said head 2 being connected with a suitable handle 3 by any preferred means.

The central tine 4 of this head 2 is preferably flattened on one face thereof and is provided intermediate its ends with a U-shaped guide 5 which is adapted to aline with a similar guide 6 secured to the handle 3 adjacent its connection with the head 2.

The U-shaped guides 5 and 6 are adapted to slidably receive an operating rod 7 which is preferably offset intermediate its ends as shown at 8 to allow said rod to lie closely against the flat face of the tine 4 and the lower end of the handle 3. The upper end of this operating rod is provided with a suitable operating handle here shown in the form of a button 9 connected by any preferred means to said rod. The lower end of said rod 7 is flattened and offset as shown at 10, and pivotally connected by a pivot pin 11 to one end of a pair of toggle links 12, said links 12 having their free ends connected by pivot pins 13 to the ends of an additional pair of toggle links 14. This additional pair of toggles 14 has its free end pivotally connected by a pin 16 to the flat face of the tine 4 adjacent its free end.

The aforesaid toggle links lie substantially parallel to the tine 4 and adjacent the flat faces thereof as clearly illustrated in Figs. 1 and 3 of the drawing. When in this position the fork is ready to be projected into a pile of hay or other substance to be lifted and the operating rod 7 is then ready to be shoved downwardly, which operation will cause the toggle links to move to a right angular position as illustrated in Fig. 2. This positioning of the toggles enables the hay to be retained upon the tines so that it can be carried a great distance without much of it being dropped or blown away. When brought to the proper location, the hay may be quickly unlocked by exerting an upward pull on the operating rod 7.

From the foregoing description taken in connection with the accompanying drawings it will be seen that I have produced a device by which a load of hay may be quickly locked and unlocked on the fork, and that when the toggles are in the position shown in Fig. 1, the fork may be conveniently used as an ordinary pitch fork.

While I have described the elements best adapted to perform the functions of my invention, it is evident that various changes in form, proportion, and in the minor details of construction may be resorted to within the scope of the appended claim without departing from or sacrificing any of the principles of this invention.

I claim as my invention:

A hand fork comprising a three-tined head, a handle connected thereto, a guide on said handle, a similar guide on the central tine of said head and alined with the first-mentioned guide, an operating rod slidable in said guides, said rod being offset intermediate its ends, an operating handle on one end of said rod, a pair of toggle links pivotally connected to the opposite end, and an additional pair of toggle links pivoted to said central tine adjacent its free end, and pivoted by their free ends to the free ends of the first-mentioned pair of toggles, said toggles being adapted to normally lie substantially parallel to said tine, but movable at a right angle thereto when actuated by the operating rod.

In testimony whereof I have hereunto set my hand in presence of two subscribing witnesses.

JOHN K. BLACKSTONE.

Witnesses:
E. R. COLE,
W. L. HANDLAY.

Copies of this patent may be obtained for five cents each, by addressing the "Commissioner of Patents, Washington, D. C."